| (12) United States Patent | (10) Patent No.: | US 8,813,901 B2 |
|---|---|---|
| Tashiro | (45) Date of Patent: | Aug. 26, 2014 |

(54) VEHICLE STEERING SYSTEM

(71) Applicant: JTEKT Corporation, Osaka (JP)

(72) Inventor: Takashi Tashiro, Kashihara (JP)

(73) Assignee: JTEKT Corporation, Osaka (JP)

( * ) Notice: Subject to any disclaimer, the term of this patent is extended or adjusted under 35 U.S.C. 154(b) by 7 days.

(21) Appl. No.: 13/772,920

(22) Filed: Feb. 21, 2013

(65) Prior Publication Data

US 2013/0228391 A1 Sep. 5, 2013

(30) Foreign Application Priority Data

Mar. 2, 2012 (JP) ................................. 2012-046927

(51) Int. Cl.
*B62D 5/00* (2006.01)
*B62D 15/02* (2006.01)

(52) U.S. Cl.
CPC ............ *B62D 5/003* (2013.01); *B62D 15/0215* (2013.01); *B62D 5/006* (2013.01); *B62D 5/001* (2013.01)
USPC ......................................................... 180/402

(58) Field of Classification Search
USPC .......................................... 180/402, 405, 407
See application file for complete search history.

(56) References Cited

U.S. PATENT DOCUMENTS

| 4,660,671 | A | * | 4/1987 | Behr et al. | ..................... 180/446 |
|---|---|---|---|---|---|
| 5,369,583 | A | * | 11/1994 | Hazelden | ........................ 701/48 |
| 6,588,540 | B2 | * | 7/2003 | Graber et al. | ................. 180/402 |
| 6,598,695 | B1 | * | 7/2003 | Menjak et al. | ................ 180/402 |
| 7,410,028 | B2 | * | 8/2008 | Chikaraishi | ................... 180/402 |
| 2003/0046012 | A1 | * | 3/2003 | Yamaguchi | ...................... 702/36 |
| 2004/0026158 | A1 | * | 2/2004 | Rieth et al. | .................... 180/402 |
| 2009/0026004 | A1 | * | 1/2009 | Hidaka et al. | ................. 180/446 |
| 2013/0218418 | A1 | * | 8/2013 | Ishihara | .......................... 701/43 |
| 2013/0253771 | A1 | * | 9/2013 | Hayama | .......................... 701/43 |
| 2013/0253772 | A1 | * | 9/2013 | Tashiro | ........................... 701/43 |

FOREIGN PATENT DOCUMENTS

| JP | A-10-278826 | 10/1998 |
|---|---|---|
| JP | A-2004-090784 | 3/2004 |

* cited by examiner

*Primary Examiner* — Joseph M Rocca
*Assistant Examiner* — Conan Duda
(74) *Attorney, Agent, or Firm* — Oliff PLC (57) ABSTRACT

A vehicle steering system in which a steering member and a steered wheel are not mechanical coupled to each other includes a rotation angle restriction mechanism that restricts a rotation angle of the steering member within a restricted angular range. In a normal mode, drive control on a steered system actuator is executed on the basis of a steering angle detected by a steering angle sensor. In a failure mode for a situation in which there is a malfunction in the steering angle sensor, drive control on the steered system actuator is executed on the basis of a steering direction detected by a steering direction detection sensor. The steering direction detection sensors detect the steering direction on the basis of at which one of a pair of terminal ends of the restricted angular range, the rotation angle restriction mechanism is restricting the rotation angle of the steering member.

5 Claims, 10 Drawing Sheets

VEHICLE STEERING SYSTEM

INCORPORATION BY REFERENCE/RELATED APPLICATION

This application claims priority to Japanese Patent Application No. 2012-046927 filed on Mar. 2, 2012 the disclosure of which, including the specification, drawings and abstract, is incorporated herein by reference in its entirety.

BACKGROUND OF THE INVENTION

1. Field of the Invention

The invention relates to a vehicle steering system.

2. Discussion of Background

Japanese Patent Application Publication No. 10-278826 (JP 10-278826 A) describes a so-called steer-by-wire steering system in which a steering member and steered wheels are not mechanically coupled to each other. JP 10-278826 A suggests that there are provided a main steering angle sensor and a backup steering angle sensor that is used in place of the main steering angle sensor in the event of a failure of the main steering angle sensor. In addition, Japanese Patent Application Publication No. 2004-90784 (JP 2004-90784 A) describes a steer-by-wire steering system in which a planetary gear mechanism is arranged between a steering member and a steered mechanism. JP 2004-90784 A suggests that, in the event of a failure of a steering angle sensor, rotation of a ring gear of the planetary gear mechanism is restrained to allow manual steering via the planetary gear mechanism of which the gear ratio has been fixed through the restraint of the rotation of the ring gear.

According to JP 10-278826 A, the multiple expensive steering angle sensors are used, which increases the manufacturing cost. According to JP 2004-90784 A, the planetary gear mechanism is used, which also increases the manufacturing cost.

SUMMARY OF THE INVENTION

The invention provides a vehicle steering system that is able to implement fail-safe at low cost.

According to a feature of an example of the invention, in a vehicle steering system in which a steering member and a steered wheel are not mechanically coupled to each other, a rotation angle restriction mechanism that restricts a rotation angle of the steering member within a restricted angular range is provided, and, in a normal mode, drive control on a steered system actuator is executed on the basis of a steering angle detected by a steering angle sensor, and, in a failure mode for a situation in which there is a malfunction in the steering angle sensor, drive control on the steered system actuator is executed on the basis of a steering direction detected by a steering direction detection sensor. The steering direction detection sensor detects the steering direction on the basis of at which one of a pair of terminal tends of the restricted angular range, the rotation angle restriction mechanism is restricting the rotation angle of the steering member.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5A.

FIG. 7A to FIG. 7D are schematic sectional views of the first coupling element and its surroundings, for illustrating the operation of a cam mechanism, wherein FIG. 7A shows a state immediately before one of the terminal ends of the restricted angular range is reached, FIG. 7B shows a state where the one of the terminal ends of the restricted angular range has been reached, FIG. 7C shows a state immediately before the other one of the terminal ends of the restricted angular range is reached, and FIG. 7D shows a state where the other one of the terminal ends of the restricted angular range has been reached;

FIG. 8A to FIG. 8C are schematic sectional views of a mechanism that detects the steering direction with the use of steering direction detection sensors, wherein FIG. 8A shows a state where the terminal ends of the restricted angular range are not reached, FIG. 8B shows a state where a protrusion of the second coupling element contacts one of the steering direction detection sensors at the one of the terminal ends of the restricted angular range, and FIG. 8C shows a state where the protrusion of the second coupling element contacts the other one of the steering direction detections sensor at the other one of the terminal ends of the restricted angular range;

DETAILED DESCRIPTION OF EMBODIMENTS

Hereinafter, embodiments of the invention will be described with reference to the accompanying drawings.

Figure 1:
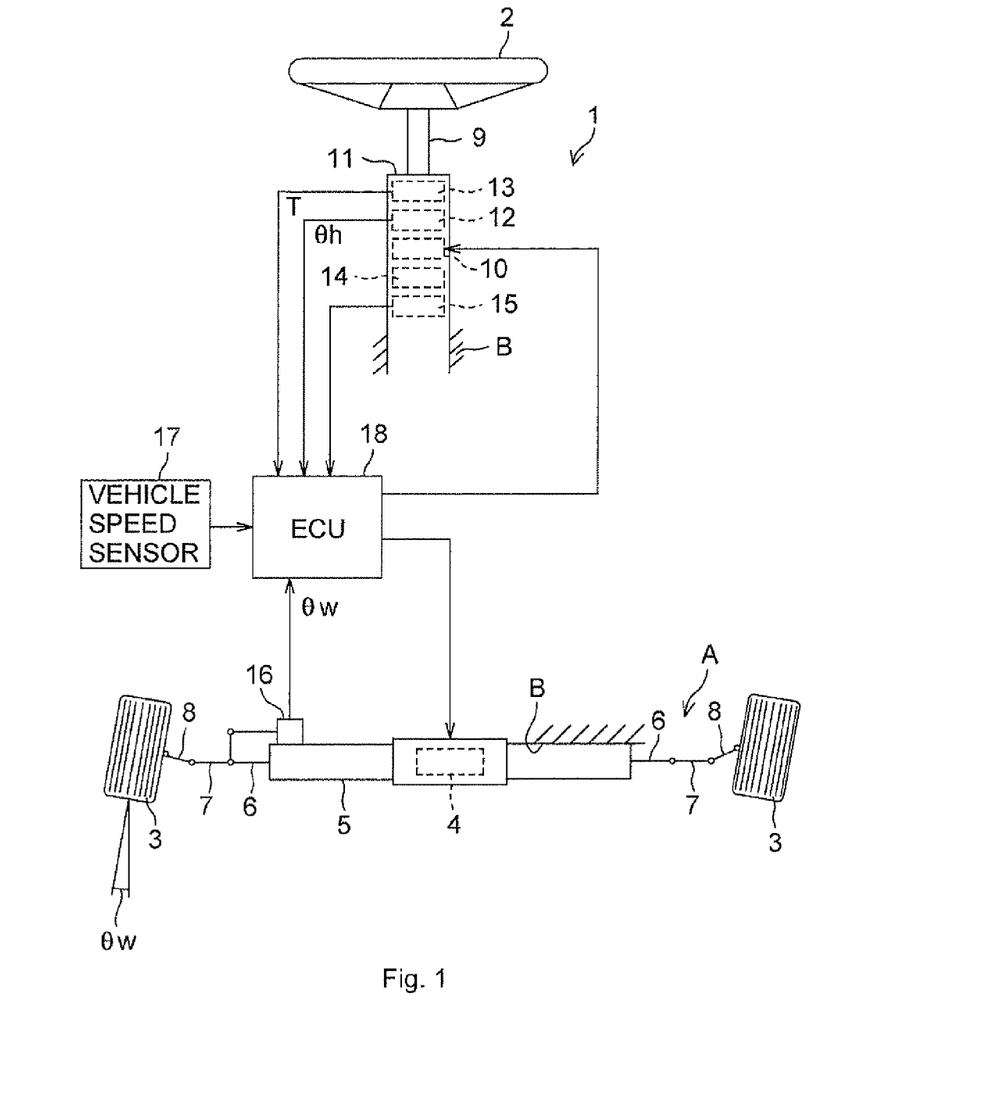
FIG. 1 is a schematic view that shows the schematic configuration of a vehicle steering system according to an embodiment of the invention.

FIG. 1 is a schematic view that shows the schematic configuration of a vehicle steering system 1 according to an embodiment of the invention. The vehicle steering system 1 constitutes a so-called steer-by-wire system in which a steering member 2, such as a steering wheel, is not mechanically coupled to steered wheels 3.

In the vehicle steering system 1, the operation of a steered system actuator 4 that is driven in response to a rotating operation of the steering member 2 is converted into a linear motion of a steered shaft 6 in the vehicle-width direction. The steered shaft 6 is supported by a housing 5. The linear motion of the steered shaft 6 is converted into steered motions of the right and left steered wheels 3. In this way, a vehicle is steered. The position of the steering member 2, which corresponds to the position of the steered wheels 3 at the time when the vehicle is travelling straight ahead, is set as the steering neutral position.

The steered system actuator 4, for example, includes an electric motor. The driving force of the electric motor (the rotational force of an output shaft) is converted into an axial linear motion of the steered shaft 6 by a ball screw mechanism provided for the steered shaft 6. The linear motion of the steered shaft 6 is transmitted to tie rods 7 coupled to respective ends of the steered shaft 6, and causes pivot motions of knuckle arms 8. Thus, the steered wheels 3 supported by the knuckle arms 8 are steered.

The steered shaft 6, the tie rods 7 and the knuckle arms 8 constitute a steered mechanism A for steering the steered wheels 3. The housing 5 that supports the steered shaft 6 is fixed to a vehicle body B. The steering member 2 is coupled to a steering shaft 9 that is rotatably supported by the vehicle body B. A reaction motor 10 is assembled to the steering shaft 9. The reaction motor 10 is used to apply reaction force, which is transmitted from a road surface, or the like, to the steered wheels 3, to the steering member 2 as steering reaction force. The reaction motor 10 includes an electric motor, such as a brushless motor. The reaction motor 10 is accommodated in a housing 11 that is fixed to the vehicle body B.

The vehicle steering system 1 includes a steering angle sensor 12 provided on the steering shaft 9. The steering angle sensor 12 is used to detect a steering angle θh of the steering member 2. A torque sensor 13 is provided on the steering shaft 9. The torque sensor 13 is used to detect a steering torque T applied to the steering member 2. The steering angle sensor 12 and the torque sensor 13 are accommodated in the housing 11. In addition, a rotation angle restriction mechanism 14 and steering direction detection sensors 15 are accommodated in the housing 11. The rotation angle restriction mechanism 14 restricts the rotation angle of the steering member 2. The steering direction detection sensors 15 serve as a steering direction detection unit.

The rotation angle restriction mechanism 14 functions to restrict the rotation angle of an output shaft 24 of the steering shaft 9 within a restricted angular range. The steering shaft 9 serves as a rotary shaft of the steering member 2 that is operated to steer the vehicle. In the steer-by-wire vehicle steering system 1 according to the present embodiment, the steering member 2 is not subjected to restrictions from the steered mechanism A. Therefore, in order to prevent the steering member 2 from being operated beyond an operation limit of the steered mechanism A, the rotation angle restriction mechanism 14 restricts the rotation angle of the steering member 2 within the restricted angular range corresponding to the operation limit.

The steering direction detection sensors 15 detect the steering direction of the steering member 2 on the basis of the operation of the rotation angle restriction mechanism 14, in the event of a failure, that is, when a malfunction occurs in the steering angle sensor 12. On the other hand, the vehicle steering system 1 includes a steered angle sensor 16 at the steered shaft 6. The steered angle sensor 16 is used to detect a steered angle θw (tire angle) of the steered wheels 3. Other than these sensors, a vehicle speed sensor 17 that detects a vehicle speed V is provided. Detection signals from these sensors 12, 13, and 15 to 17 are input into an electronic control unit (ECU) 18 that serves as a control unit that includes a microcomputer.

The ECU 18 sets a target steered angle on the basis of the steering angle θh detected by the steering angle sensor 12 and the vehicle speed V detected by the vehicle speed sensor 17. The ECU 18 executes drive control (steering control) on the steered system actuator 4 via a drive circuit (not shown) incorporated in the ECU 18 on the basis of a deviation between the target steered angle and the steered angle θw detected by the steered angle sensor 16.

On the other hand, the ECU 18 executes drive control (reaction control) on the reaction motor 10 via the drive circuit (not shown) incorporated in the ECU 18 such that an appropriate reaction force, which is headed in a direction opposite to the direction in which the steering member 2 is steered, is applied to the steering member 2 on the basis of the detection signals output from the sensors 12, 13, and 15 to 17.

Figure 2:
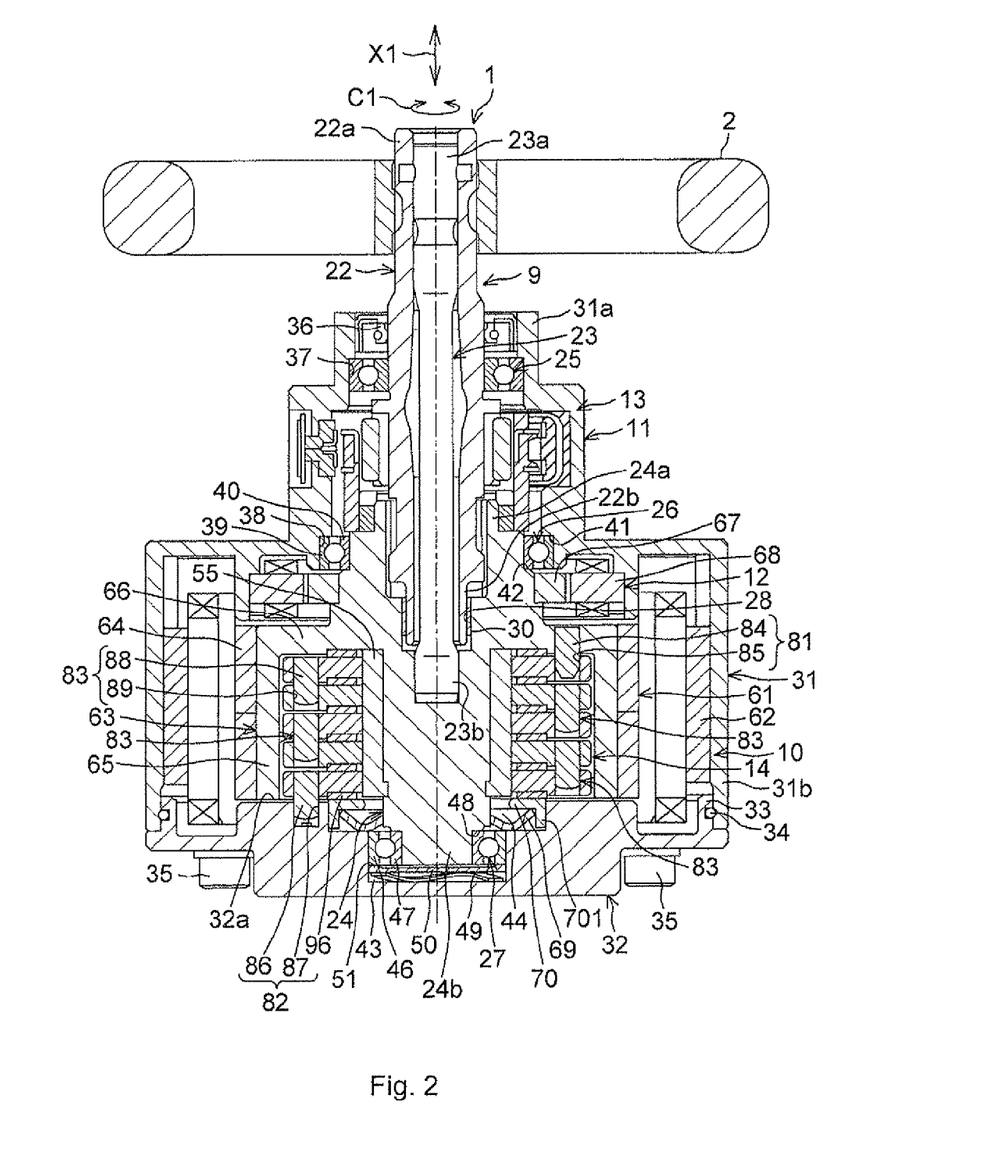
FIG. 2 is a sectional view of a housing that accommodates a reaction motor, a rotation angle restriction mechanism that restricts the rotation angle of a steering member, and the like, and shows a normal state.

As shown in FIG. 2, the steering shaft 9 is rotatably supported by the tubular housing 11. One end of the steering shaft 9 protrudes from the housing 11, and the steering member 2 is coupled to the one end so as to be rotatable together with the steering shaft 9. The steering angle sensor 12, the torque sensor 13 and the reaction motor 10 are accommodated in the housing 11.

The steering shaft 9 includes an input shaft 22 and the output shaft 24. The steering member 2 is coupled to one end 22a of the input shaft 22 (which corresponds to the above-described one end of the steering shaft 9) so as to be rotatable together with the input shaft 22. The output shaft 24 is coaxially coupled to the input shaft 22 via a torsion bar 23 such that transmission of torque between the input shaft 22 and the output shaft 24 is allowed. One end 23a of the torsion bar 23 is coupled to the input shaft 22 so as to be rotatable together with the input shaft 22. The other end 23b of the torsion bar 23 is coupled to the output shaft 24 so as to be rotatable together with the output shaft 24.

The steering shaft 9 is rotatably supported by a first bearing 25, a second bearing 26 and a third bearing 27 that are retained by the housing 11. An axially intermediate portion of the input shaft 22 is rotatably supported by the first bearing 25. The output shaft 24 is rotatably supported by the second bearing 26 and the third bearing 27. Specifically, the second bearing 26 supports a portion near one end 24a of the output shaft 24 such that the output shaft 24 is rotatable, and the third bearing 27 supports the other end 24b of the output shaft 24 such that the output shaft 24 is rotatable.

The other end 22b of the input shaft 22 is inserted in a support hole 28 formed in the output shaft 24. The other end 22b of the input shaft 22 is rotatably supported by the inner periphery of the output shaft 24, which defines the support hole 28, via a fourth bearing 30. The housing 11 is formed of a combination of a housing body 31 and an end wall 32. The housing body 31 has a tubular shape, and has one end 31a and the other end 31b. The end wall 32, which is part of the housing 11, closes the other end 31b of the housing body 31.

Specifically, the end wall 32 has a tubular portion 33 that protrudes in the axial direction from a portion near an outer peripheral portion thereof, and the tubular portion 33 is fitted to the inner periphery of the other end 31b of the housing body 31. A seal member 34 is accommodated in an accommodation groove formed in the outer periphery of the tubular portion 33. Sealing performance at a joint between the housing body 31 and the tubular portion 33 is ensured by the seal member 34. The end wall 32 is fixed to the other end 31b of the housing body 31 with the use of fixing screws 35, and the like.

The end wall 32 and a pressing plate 70 (described later) constitute a non-rotatable element (described later) of the rotation angle restriction mechanism 14. The end wall 32 is part of the housing 11. The rotation of the pressing plate 70 is restricted by the end wall 32 via an urging member 69 (described later). An oil seal 36 is interposed between the inner periphery of the one end 31a of the housing body 31 and the outer periphery of the input shaft 22 of the steering shaft 9, and seals a gap therebetween. The first bearing 25 is retained by a bearing retaining portion 37 provided on the inner periphery of the one end 31*a* of the housing body 31.

The second bearing 26 is retained by a bearing retaining portion 38 formed at an axially intermediate portion of the housing body 31, and the outer periphery of a portion of the output shaft 24, which is near the one end 24*a*, is rotatably supported by the second bearing 26. The second bearing 26 includes an outer ring 39 and an inner ring 40. The outer ring 39 is fixedly fitted to the bearing retaining portion 38. The inner ring 40 is fitted to the outer periphery of the output shaft 24 so as to be rotatable together with the output shaft 24.

One end face of the outer ring 39 of the second bearing 26 contacts a positioning step 41 formed at one end of the bearing retaining portion 38 of the housing body 31. The positioning step 41 restricts movement of the outer ring 39 toward one side (toward the first bearing 25) in an axial direction X1 of the output shaft 24. One end face of the inner ring 40 of the second bearing 26 contacts a positioning step 42 formed on the outer periphery of the output shaft 24. The positioning step 42 restricts movement of the inner ring 40 toward the other side (toward the third bearing 27) in the axial direction X1 of the output shaft 24.

A circular center recess 43 and an annular recess 44 are formed in an inner wall face 32*a* of the end wall 32. The center recess 43 serves as a first recess. The annular recess 44 surrounds the center recess 43 and serves as a second recess. The depth of the center recess 43 is greater than the depth of the annular recess 44. The other end 24*b* of the output shaft 24 is inserted in the center recess 43. The third bearing 27 is retained by the inner periphery of the end wall 32, which defines the center recess 43, and the other end 24*b* of the output shaft 24 is rotatably supported by the third bearing 27.

The third bearing 27 includes an outer ring 46 and an inner ring 47. The outer ring 46 is loosely fitted to the inner periphery of the end wall 32, which defines the center recess 43, so as to be axially movable. The inner ring 47 is fitted to the outer periphery of the other end 24*b* of the output shaft 24 so as to be rotatable together with the output shaft 24. One end face of the inner ring 47 of the third bearing 27 contacts a positioning step 48 formed on the outer periphery of the output shaft 24. The positioning step 48 restricts movement of the inner ring 47 toward the one side (toward the second bearing 26) in the axial direction X1 of the output shaft 24.

An elastic member 49 and a spacer 50 are accommodated in the center recess 43. The elastic member 49 is formed of a wavy leaf spring, and collectively applies an axial preload to the second bearing 26 and the third bearing 27. The spacer 50 serves as a preload application member, and is interposed between the elastic member 49 and the third bearing 27. The spacer 50 is formed of a circular plate or an annular plate as shown in FIG. 2. The spacer 50 has an annular protrusion 51 such that the spacer 50 contacts neither the end face of the other end 24*b* of the output shaft 24 nor the end face of the inner ring 47 of the third bearing 27 and contacts only the end face of the outer ring 46. The elastic member 49 urges the outer ring 46 of the third bearing 27 via the annular protrusion 51 of the spacer 50 toward the one side in the axial direction X1 of the output shaft 24.

The urging force is received by the positioning step 41 of the housing body 31 via the outer ring 46 of the third bearing 27, the inner ring 47 of the third bearing 27, the positioning step 48 of the output shaft 24, the positioning step 42 of the output shaft 24, the inner ring 40 of the second bearing 26 and the outer ring 39 of the second bearing 26. Therefore, it is possible to collectively apply an axial preload to the second bearing 26 and the third bearing 27.

The torque sensor 13 is arranged between the first bearing 25 and the second bearing 26 in the housing 11. The torque sensor 13 may be, for example, a torque sensor that uses a Hall IC (magnetic sensor). The ECU 18 is configured to calculate a steering torque input into the steering shaft 9 on the basis of a signal from the torque sensor 13.

The reaction motor 10 includes a rotor 61 and a stator 62. The rotor 61 is coupled to the output shaft 24 so as to be rotatable together with the output shaft 24. The stator 62 concentrically surrounds the rotor 61, and is fixed to the inner periphery of the housing body 31. The rotor 61 includes a rotor core 63 and a permanent magnet 64. The rotor core 63 is rotatable together with the output shaft 24. The permanent magnet 64 is coupled to the rotor core 63 so as to be rotatable together with the rotor core 63.

The rotor core 63 has a tubular first portion 65 and a second portion 66. The first portion 65 concentrically surrounds the output shaft 24. The second portion 66 couples one end 65*a* of the first portion 65 to the output shaft 24 such that the first portion 65 and the output shaft 24 are rotatable together with each other. The permanent magnet 64 is coupled to the outer periphery of the first portion 65 so as to be rotatable together with the first portion 65. The second portion 66 constitutes a rotatable element (described later) of the rotation angle restriction mechanism 14. In the present embodiment, description is made on an example in which the rotor core 63 that includes the first portion 65 and the second portion 66 is formed integrally with the output shaft 24 from a single material. Alternatively, a rotor core that is formed separately from the output shaft 24 may be fixedly coupled to the output shaft 24.

In the housing 11, the steering angle sensor 12 is arranged between the second portion 66 and the second bearing 26. The steering angle sensor 12 is formed of, for example, a resolver. The steering angle sensor 12 includes a resolver rotor 67 and a resolver stator 68. The resolver rotor 67 is coupled to the output shaft 24 so as to be rotatable together with the output shaft 24. The resolver stator 68 is fixed to the inner periphery of the housing body 31, and surrounds the resolver rotor 67.

Figure 3:
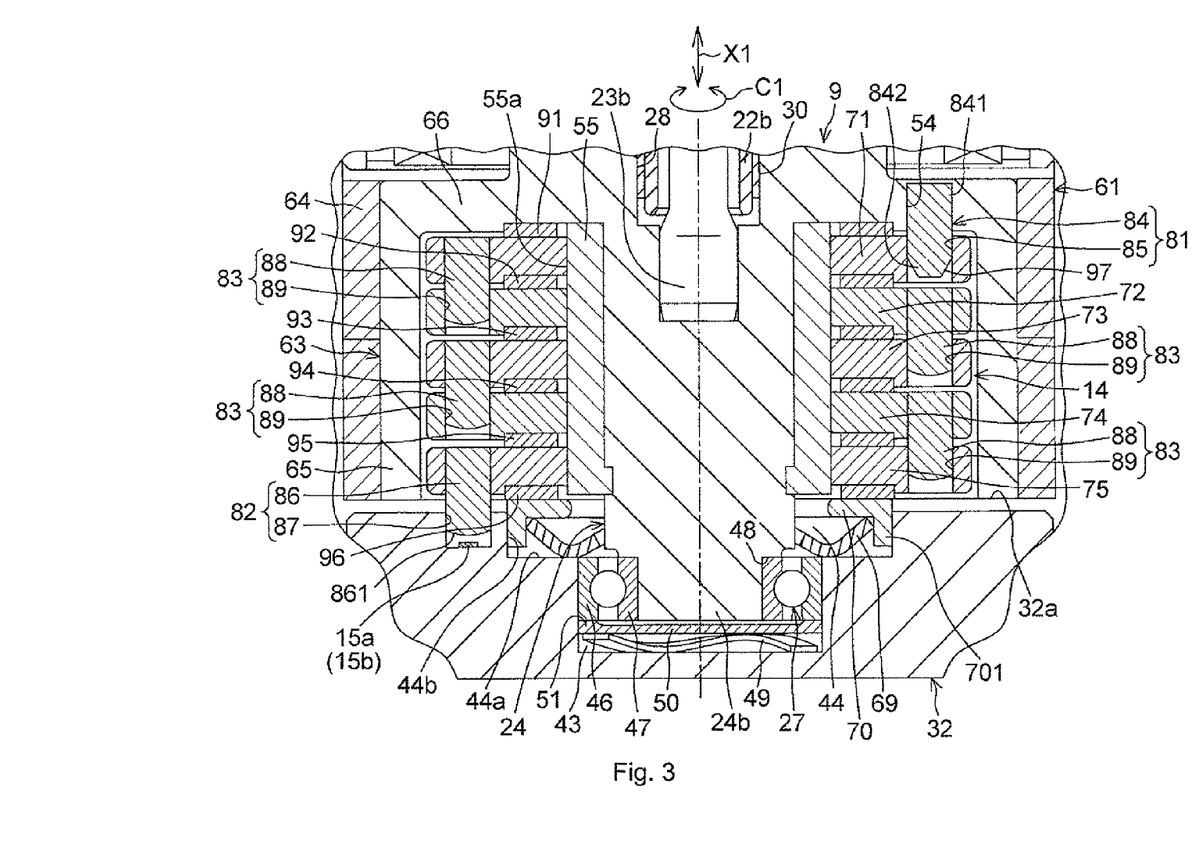
FIG. 3 is a partially enlarged sectional view of the rotation angle restriction mechanism and its surroundings in FIG. 2, and shows a state where terminal ends of a restricted angular range are not reached.
Figure 4:
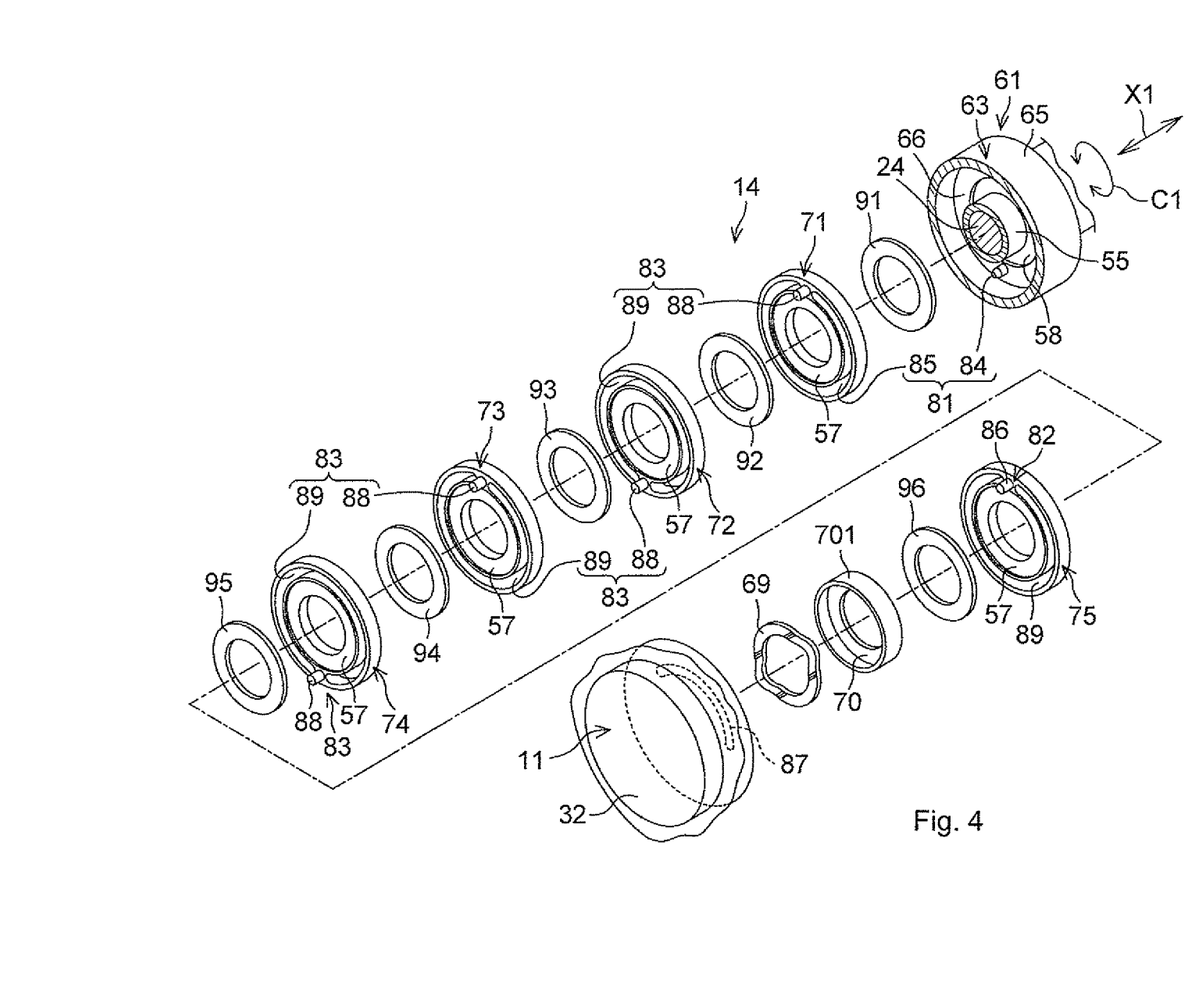
FIG. 4 is an exploded perspective view of the rotation angle restriction mechanism.

FIG. 3 is an enlarged view of the rotation angle restriction mechanism 14. The rotation angle restriction mechanism 14 is arranged in a space radially inward of the first portion 65 of the rotor core 63 of the rotor 61. FIG. 4 is an exploded perspective view of the rotation angle restriction mechanism 14. The rotation angle restriction mechanism 14 includes the end wall 32 of the housing 11, a plurality of plate elements 71 to 75 and the second portion 66 of the rotor core 63. The end wall 32 of the housing 11 serves as the non-rotatable element. The plate elements 71 to 75 are coaxially supported by the output shaft 24 of the steering shaft 9 that serves as the rotary shaft of the steering member 2. The plate elements 71 to 75 are rotatable with respect to the output shaft 24 and are movable in the axial direction X1. The second portion 66 of the rotor core 63 serves as the rotatable element. The end wall 32 that serves as the non-rotatable element and the second portion 66 that serves as the rotatable element are arranged on respective sides of the plate elements 71 to 75 in the axial direction X1.

The rotation angle restriction mechanism 14 includes a plurality of coupling elements 81, 82, 83 that couple adjacent elements, among the non-rotatable element (end wall 32), the plate elements 71 to 75 and the rotatable element (second portion 66), so as to restrict an amount of relative rotation between the adjacent elements. The rotation angle restriction mechanism 14 includes a plurality of friction plates 91 to 96 that serve as a plurality of friction application elements. The friction plates 91 to 96 each apply friction resistance to relative rotation between the adjacent elements.

As shown in FIG. 3 and FIG. 4, the coupling elements are formed of the first coupling element 81, the second coupling element 82 and the third coupling elements 83. The third coupling elements 83 are the remaining coupling elements.

Figure 6A:
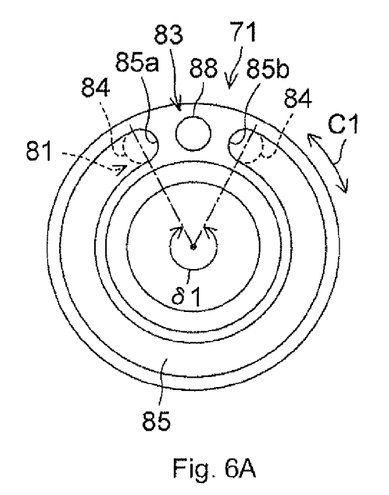
FIG. 6A is a schematic view that illustrates a movement range of a first coupling element.

The first coupling element 81 is formed of a pin-shaped protrusion 84 and a closed-end engagement groove 85 (see FIG. 6A). The pin-shaped protrusion 84 is provided at the second portion 66 of the rotor core 63 (rotatable element) so as to protrude in the axial direction X1. The engagement groove 85 is formed in the plate element 71 adjacent to the second portion 66 (rotatable element) such that the protrusion 84 engages with the engagement groove 85, and extends in a circumferential direction C1.

The protrusion 84 of the first coupling element 81 is fixedly fitted in a fixing hole 54 formed in the second portion 66 (rotatable element). The protrusion 84 has a columnar main portion 841 and a tapered portion 842 formed at the distal end of the protrusion 84. The second coupling element 82 is formed of a pin-shaped protrusion 86 and a closed-end engagement groove 87 (see FIG. 6C). The protrusion 86 is provided at the plate element 75, which is one of the axially endmost plate elements among the plate elements 71 to 75, so as to protrude in the axial direction X1. The engagement groove 87 is formed in the end wall 32 of the housing 11 (non-rotatable element) such that the protrusion 86 engages with the engagement groove 87, and extends in the circumferential direction C1. Each of the third coupling elements 83 is formed of a pin-shaped protrusion 88 and a closed-end engagement groove 89 (see FIG. 6B). The protrusion 88 is provided at one of mutually adjacent two plate elements among the plate elements 71 to 75, and protrudes in the axial direction X1. The engagement groove 89 is formed in the other one of the mutually adjacent two plate elements among the plate elements 71 to 75 so as to extend in the circumferential direction C1 such that the protrusion 88 engages with the engagement groove 89.

Figure 8A:
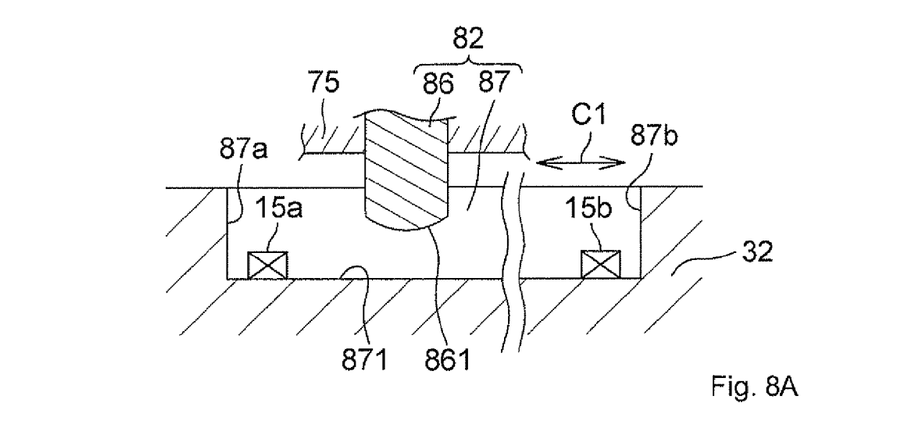

As shown in FIG. 8A that is a schematic sectional view of the end wall 32 and its surroundings, the engagement groove 87 formed in the end wall 32 has a bottom portion 871 and a pair of terminal ends. The steering direction detection sensors 15a, 15b are installed on the bottom portion 871, at the respective terminal ends of the engagement groove 87. Each of the steering direction detection sensors 15a, 15b is, for example, formed of a contact sensor. The steering direction detection sensor 15a is arranged near a restricting portion 87a, and detects, for example, steering to the left. The steering direction detection sensor 15b is arranged near a restricting portion 87b, and detects, for example, steering to the right.

Figure 7A:
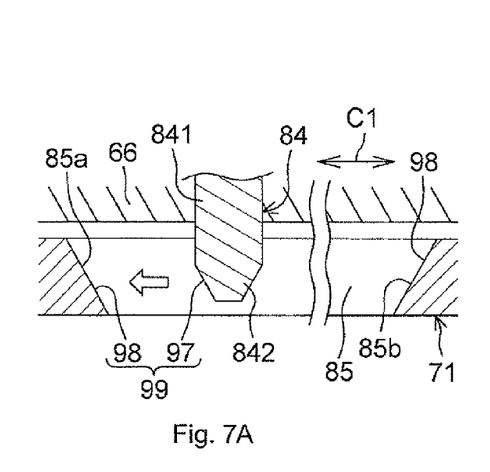

As shown in FIG. 7A that is a schematic sectional view of the plate element 71 and its surroundings, a cam mechanism 99 is formed of a cam 97 and cam followers 98. The cam 97 is formed of an inclined peripheral face of the tapered portion 842 of the protrusion 84. The cam followers 98 are formed of inclined surfaces respectively formed at the restricting portions 85a, 85b at respective ends of the engagement groove 85. In this specification, the cam mechanism is a mechanical interlocking mechanism that applies predetermined motion to a driven portion (cam follower) in accordance with the surface shape of the cam.

Figure 7B:
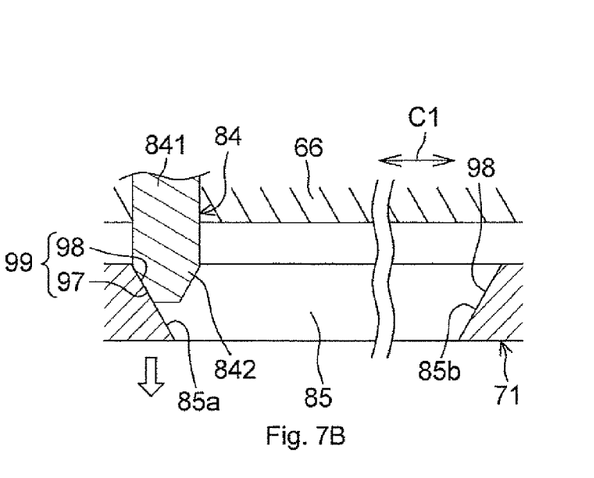
Figure 7C:
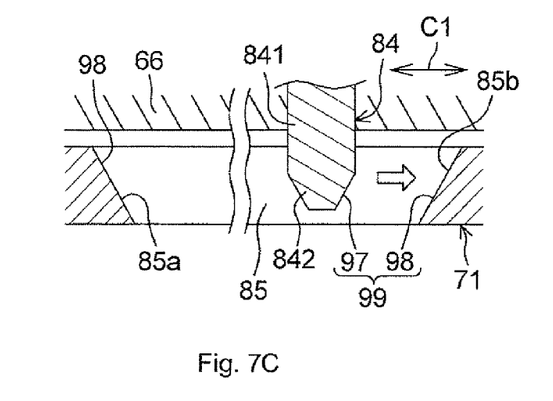

As shown in FIG. 7A and FIG. 7B, at one of terminal ends of the restricted angular range set by the rotation angle restriction mechanism 14, the cam mechanism 99 converts the rotation of the plate element 71 into an axial movement of the plate element 71 to press the plate element 71 in the axial direction. In addition, as shown in FIG. 7C and FIG. 7D, at the other one of the terminal ends of the restricted angular range, the cam mechanism 99 converts the rotation of the plate element 71 into an axial movement of the plate element 71 to press the plate element 71 in the axial direction.

Figure 8B:
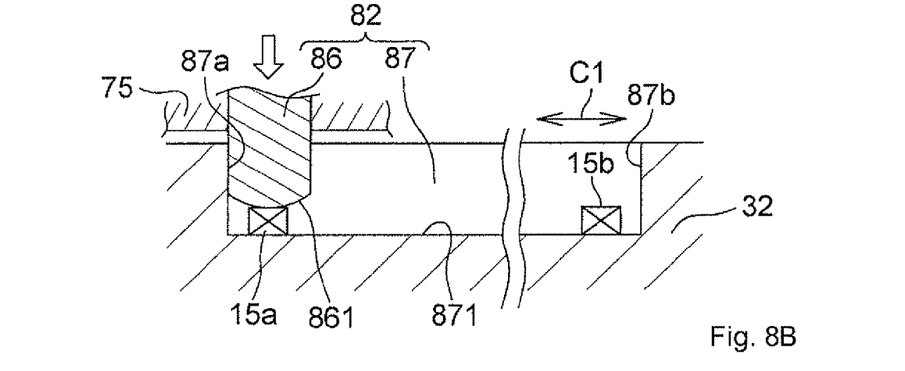
Figure 9:
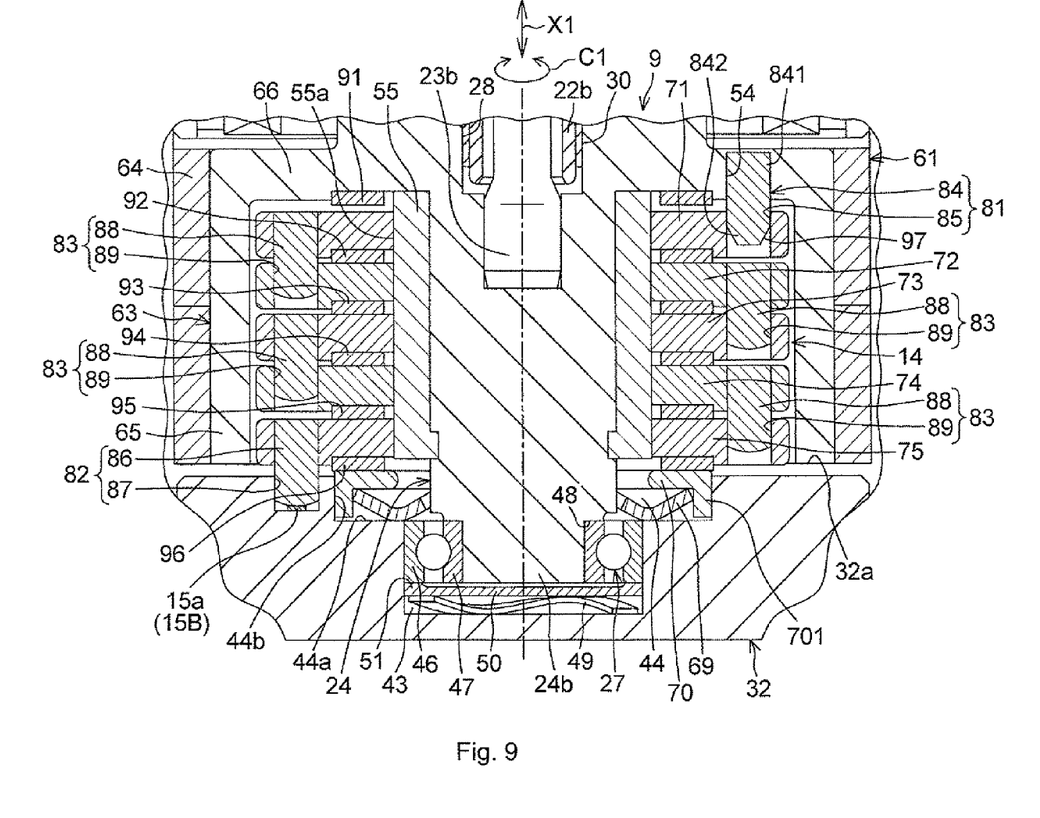
FIG. 9 is a sectional view of the rotation angle restriction mechanism and its surroundings, and shows a state where one of the terminal ends of the restricted angular range has been reached.

Thus, as shown in FIG. 9, the cam mechanism 99 functions to move all the plate elements 71 to 75 toward the end wall 32 (non-rotatable element) in the axial direction. That is at the one of terminal ends of the restricted angular range, the cam mechanism 99 functions to move the plate element 75, which is one of the axially endmost plate elements among the plate elements 71 to 75, toward the end wall 32 (non-rotatable element). That is, at one of the terminal ends of the restricted angular range, when the plate element 71 moves in the axial direction as shown in FIG. 7B and the plate element 75 at one end in the axial direction moves toward the end wall 32 (non-rotatable element) as shown in FIG. 8B, a top portion 861 of the protrusion 86 of the second coupling element 82 fixed to the plate element 75 contacts the corresponding steering direction detection sensor 15a on the bottom portion 871 of the engagement groove 87. A contact signal is output from the steering direction detection sensor 15a to the ECU 18, and the ECU 18 determines that, for example, steering to the left is carried out.

Figure 7D:
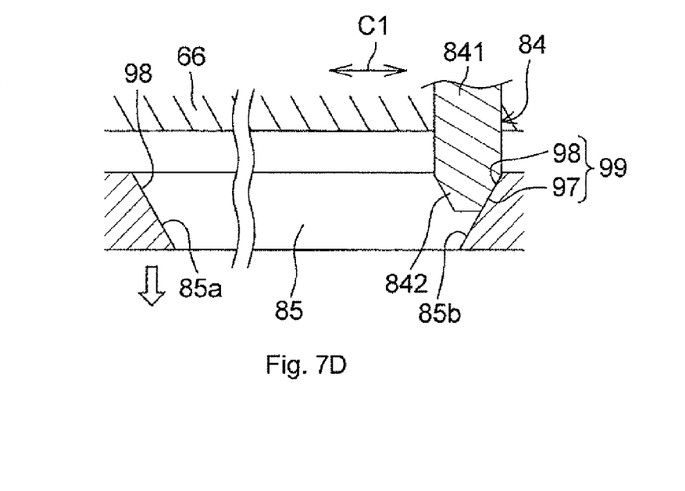
Figure 8C:
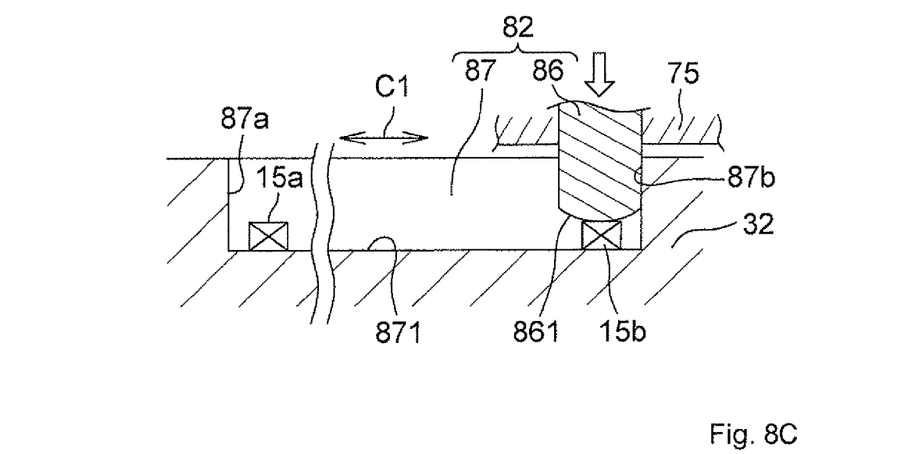

At the other one of the terminal ends of the restricted angular range, when the plate element 71 moves in the axial direction as shown in FIG. 7D and the plate element 75 at one end in the axial direction moves toward the end wall 32 (non-rotatable element) as shown in FIG. 8C, the top portion 861 of the protrusion 86 of the second coupling element 82 fixed to the plate element 75 contacts the corresponding steering direction detection sensor 15b on the bottom portion 871 of the engagement groove 87. A contact signal is output from the steering direction detection sensor 15b to the ECU 18, and the ECU 18 determines that, for example, steering to the right is carried out.

Figure 6B:
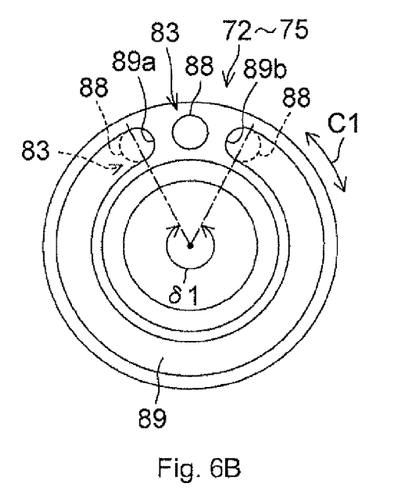
FIG. 6B is a schematic view that illustrates a movement range of each third coupling element.
Figure 6C:
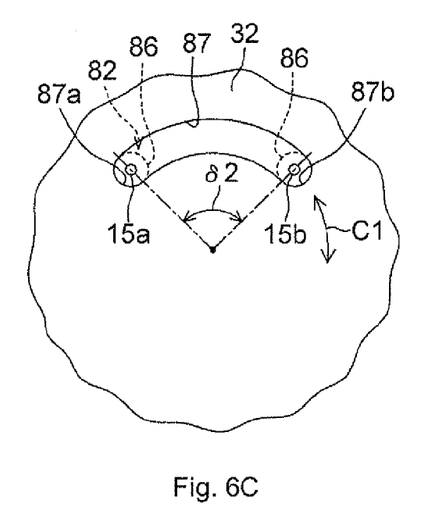
FIG. 6C is a schematic view that illustrates a movement range of a second coupling element.

As shown in FIG. 6A, in the first coupling element 81, the protrusion 84 is engaged with the engagement groove 85 of the plate element 71 so as to be slidable in the circumferential direction C1. When the protrusion 84 engages with one of the restricting portions 85a, 85b that are respective ends of the engagement groove 85, the amount of relative rotation between the second portion 66 (rotatable element) and the plate element 71, which are the adjacent elements, is restricted. In addition, as shown in FIG. 6C, in the second coupling element 82, the protrusion 86 is engaged with the engagement groove 87 of the end wall 32 (non-rotatable element) so as to be slidable in the circumferential direction C1. When the protrusion 86 engages with one of the restricting portions 87a, 87b that are respective ends of the engagement groove 87, the amount of relative rotation between the plate element 75 and the end wall 32, which are the adjacent elements, is restricted. In addition, as shown in FIG. 6B, in each of the third coupling elements 83, the protrusion 88 is engaged with the engagement groove 89 so as to be slidable in the circumferential direction C1. When the protrusion 88 engages with one of the restricting portions 89a, 89b that are respective ends of the engagement groove 89, the amount of relative rotation between the corresponding adjacent two of the plate elements 71 to 75 is restricted.

As shown in FIG. 3 and FIG. 4, each of the plate elements 71 to 75 is formed of an annular plate, and is arranged between the first portion 65 and the output shaft 24. The plate elements 71 to 75 are supported on an outer periphery 55a of a tubular member 55 (for example, a plain bearing, such as a metal bush) so as to be rotatable and movable in the axial direction. The tubular member 55 is fitted to the outer periphery of the output shaft 24 so as to be rotatable together with the output shaft 24. The plate elements 71 to 75 are rotatable relative to the output shaft 24 and the first portion 65.

Figure 5A:
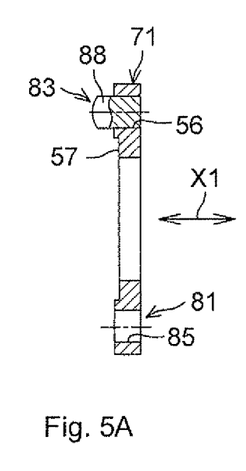
Figure 5B:
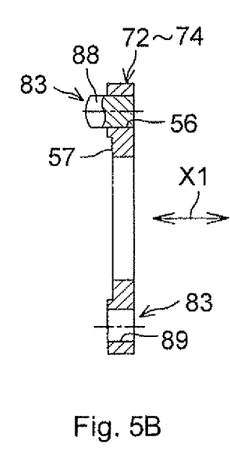
FIG. 5B and FIG. 5C are sectional views of plate elements of the rotation angle restriction mechanism.
Figure 5C:
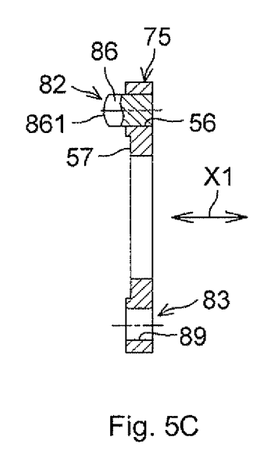

As shown in FIG. 5A, the protrusion 88 of the third coupling element 83 is formed at one end face of the plate element 71 so as to protrude therefrom, and the engagement groove 85 of the first coupling element 81, which extends in the circumferential direction C1, is formed in the remaining region other than the protrusion 88. As shown in FIG. 5B, the protrusion 88 of the third coupling element 83 is formed at one end face of each of the plate elements 72 to 74 so as to protrude therefrom, and the engagement groove 89 of the third coupling element 83, which extends in the circumferential direction C1, is formed in the remaining region other than the protrusion 88. As shown in FIG. 5C, the protrusion 86 of the second coupling element 82 is formed at one end face of the plate element 75 so as to protrude therefrom, and the engagement groove 89 of the third coupling element 83, which extends in the circumferential direction C1, is formed in the remaining region other than the protrusion 86.

As shown in FIG. 5A to FIG. 5C, each of the protrusions 86, 88 may be formed separately from a corresponding one of the plate elements 71 to 75, and part of each of the protrusions 86, 88 may be fixedly fitted in the fixing hole 56 of the corresponding one of the plate elements 71 to 75. Although not shown in the drawing, each protrusion may be formed integrally with the corresponding one of the plate elements 71 to 75 from a single material. An annular receiving recess 57 is formed in at least one end face (end face from which each of the protrusions 86, 88 protrudes in the present embodiment) of each of the plate elements 71 to 75.

As shown in FIG. 4, each receiving recess 57 receives a corresponding one of the friction plates 92 to 96. In addition, the outer periphery of each of the friction plates 92 to 96 is rotatably supported by the peripheral wall face of the corresponding one of the receiving recesses 57. On the other hand, an annular receiving recess 58 is formed in the second portion 66 of the rotor core 63 of the rotor 61. The outer periphery of the friction plate 91 is rotatably supported by the peripheral wall face of the receiving recess 58.

As shown in FIG. 6A, in the first coupling element 81, the range in which the engagement groove 85 is arranged in the circumferential direction C1 may be set as follows: the movement range of the protrusion 84 that engages with the engagement groove 85 of the plate element 71 (range in which the protrusion 84 moves between the restricting portions 85a, 85b at respective ends of the engagement groove 85) is formed such that the relative rotation angle between the adjacent elements (between the plate element 71 and the second portion 66 that is not shown in FIG. 6A) becomes δ1.

As shown in FIG. 6B, in each of the third coupling elements 81, the range in which the engagement groove 89 is arranged in the circumferential direction C1 may be set as follows: the movement range of the protrusion 88 that engages with the engagement groove 89 of a corresponding one of the plate elements 72 to 75 (range in which the protrusion 88 moves between the restricting portions 89a, 89b at respective ends of the engagement groove 89) is formed such that the relative rotation angle between the adjacent elements (adjacent two of the plate elements 71 to 75) becomes δ1.

As shown in FIG. 6C, in the second coupling element 82, the range in which the engagement groove 87 is arranged in the circumferential direction C1 may be set as follows: the movement range of the protrusion 86 of the plate element 75 (not shown in FIG. 6C), which engages with the engagement groove 87 of the end wall 32 (non-rotatable element) (range in which the protrusion 86 moves between the restricting portions 87a, 87b at respective ends of the engagement groove 87) is formed such that the relative rotation angle between the adjacent elements (between the plate element 75 and the end wall 32) becomes δ2.

In this case, a restricted angular range δmax that is set by the rotation) angle restriction mechanism 14 and that corresponds to the maximum rotation angle of the steering shaft 9 is obtained as follows.

$$\delta max = \delta 1 \times 5 + \delta 2$$

Therefore, it is possible to restrict the rotation amount of the steering shaft 9 to a desired multiple rotation range. For example, when δ1 is 306° and δ2 is 90°, the rotation amount of the steering shaft 9 is restricted within 1620° (predetermined angle). However, δ1 may be equal to δ2.

As shown in FIG. 3 and FIG. 4, each of the friction plates 91 to 96 is interposed between corresponding two adjacent elements such that friction resistance against relative rotation between the corresponding two adjacent elements is applied to the corresponding two adjacent elements. For example, the friction plate 91 is interposed between the second portion 66 (rotatable element) and the plate element 71, and applies friction resistance against the relative rotation between the elements 66, 71, to the elements 66, 71. The friction plates 92 to 95 are respectively interposed between the adjacent plate elements 71, 72, between the adjacent plate elements 72, 73, between the adjacent plate elements 73, 74 and between the adjacent plate elements 74, 75, and apply friction resistance against relative rotation between the corresponding adjacent two of the plate elements 71 to 75 to the corresponding adjacent two of the plate elements 71 to 75. The friction plate 96 is interposed between the plate element 75 and the pressing plate 70, and applies friction resistance against relative rotation between the plate element 75 and the pressing plate 70, to the plate element 75 and the pressing plate 70.

As shown in FIG. 3, the urging member 69 and the pressing plate 70 are accommodated and retained in the annular recess 44 of the inner wall face 32a of the end wall 32 of the housing 11. The urging member 69 and the pressing plate 70 each have an annular shape, and surround the output shaft 24. The wavy leaf spring is used as the urging member 69. The urging member 69 is interposed between a bottom 44a of the annular recess 44 and the pressing plate 70.

The pressing plate 70 has, for example, an annular protruding portion 701 that serves as an axial movement restricting element and that protrudes from the outer periphery of the pressing plate 70 in the axial direction. The annular protruding portion 701 is formed integrally with the pressing plate 70 from a single material. The outer periphery of the annular protruding portion 701 is supported by a peripheral wall face 44b, which defines the annular recess 44, so as to be movable in the axial direction X1. The annular protruding portion 701 surrounds the urging member 69 formed of the wavy leaf spring.

The urging member 69 elastically urges the pressing plate 70 toward the friction plate 96. Thus, the urging member 69 elastically holds a laminated unit between the pressing plate 70 (non-rotatable element) and the second portion 66 (rotatable element) of the rotor 61. The laminated unit includes the plate elements 71 to 75 and the friction plates 91 to 96 that serve as the friction resistance application elements. That is, the urging member 69 collectively applies an axial preload to the plate elements 71 to 75 and friction plates 91 to 96 of the laminated unit. Thus, the friction plates 91 to 96 are able to apply friction resistance having a desired magnitude to members that contact the friction plates 91 to 96.

In addition, in a state where the laminated unit, which includes the plate elements 71 to 75 and the friction plates 91 to 96 that serve as the friction resistance application elements, is pressed toward the second portion 66 of the rotor 61, a clearance is formed between the protruding portion 701 and the end wall 32 (specifically, the bottom 44a of the annular recess 44).

Figure 10:
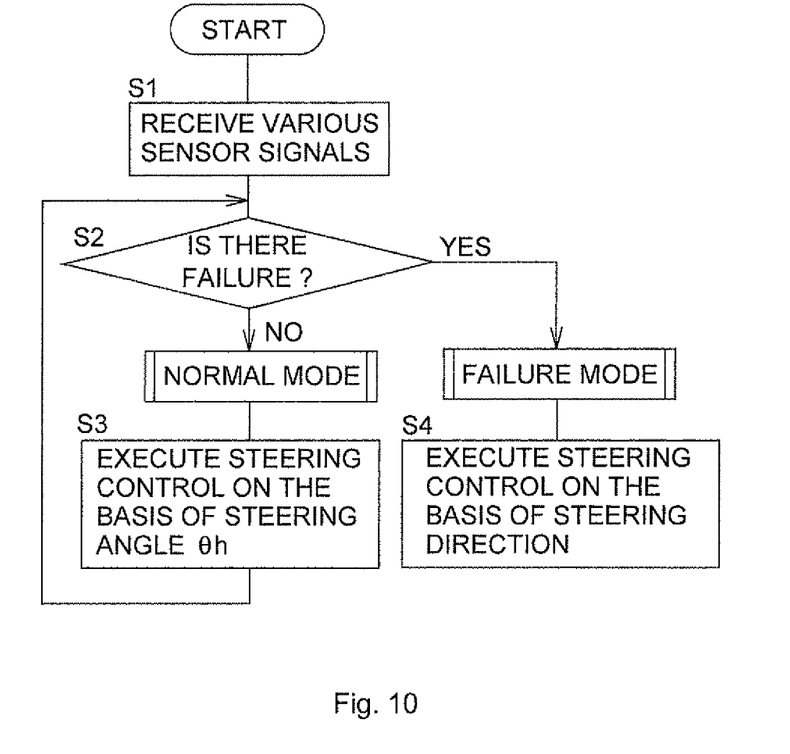
FIG. 10 is a flowchart that shows the flow of main control that is executed by an ECU.

FIG. 10 is a flowchart that shows the flow of control related to the steering control, which is executed by the ECU 18. When a system is activated, first, in step S1, signals from the various sensors are input into the ECU 18. In step S2, it is determined whether there is a failure (malfunction in the steering angle sensor 12) on the basis of the signal from the steering angle sensor 12.

When there is no failure (NO in step S2), the process shifts into a normal mode. In the normal mode, the steered system actuator 4 is subjected to drive control (steering control) on the basis of the steering angle δh detected by the steering angle sensor 12.

When there is a failure (YES in step S2), the process shifts into a failure mode. In the failure mode, on the basis of the steering direction detected by the steering direction detection sensor 15a (or 15b), the steered system actuator 4 is subjected to drive control (steering control) such that the steered system actuator 4 is driven in the corresponding steering direction while the contact sensor 15a (or 15b) is on.

According to the present embodiment, in the event of a failure, that is, in the event of a malfunction in the steering angle sensor 12, when the steered steering member 2 reaches one of the terminal ends of the restricted angular range, which corresponds to the steering direction, the corresponding steering direction detection sensor 15a (or 15b) detects the steering direction. By subjecting the steered system actuator 4 to drive control on the basis of the detected steering direction, it is possible to carry out steering, thereby implementing fail-safe.

The steering direction detection unit just need to detect the steering direction on the basis of at which one of the terminal ends of the restricted angular range, the rotation angle restriction mechanism 14 is restricting the rotation angle of the steering member 2. Therefore, it is possible to use an inexpensive steering direction detection unit. Specifically, as each of the steering direction detection sensors 15a, 15b, a simple and inexpensive on/off sensor, or the like, may be used. Therefore, it is possible to reduce the manufacturing cost.

In addition, when the steering member 2 steered in the event of a failure reaches the terminal end of the restricted angular range, which corresponds to the steering direction, the cam mechanism 99 axially moves the plate element 75, which is one of the axially endmost plate elements among the plate elements 71 to 75. With the axial movement of the plate element 75, the corresponding steering direction detection sensor 15a (or 15b) is activated. Therefore, it is possible to detect the steering direction on the basis of at which one of the terminal ends of the restricted angular range, the rotation angle of the steering member 2 is being restricted.

In addition, when the steering member 2 steered in the event of a failure reaches the terminal end of the restricted angular range, which corresponds to the steering direction, the cam mechanism 99 of the first coupling element 81 increases the distance between the corresponding adjacent elements (the second portion 66, which serves as the rotatable element, and the plate element 71) against the urging member 69. Thus, for example, the steering direction detection sensor 15a (15b) arranged on the bottom portion 871 of the engagement groove 87 of the second coupling element 82 detects the steering direction on the basis of, for example, a contact with the protrusion 86. By subjecting the steered system actuator 4 to drive control on the basis of the detected steering direction, it is possible to carry out steering, thereby implementing fail-safe.

The cam mechanism 99 is formed of the cam 97 formed of the inclined surface of the protrusion 84 of the first coupling element 81, and the cam followers 98 that are formed of inclined surfaces of the restricting portions 85a, 85b of the engagement groove 85, and converts the rotation into an axial movement. In the present embodiment, both the cam 97 and the cam followers 98 are formed of inclined surfaces. However, the configuration is not limited to this as long as at least one of the cam 97 and the cam followers 98 of the cam mechanism 99 are formed of inclined surfaces.

When the protrusion 84 having the tapered portion 842, on which the inclined surface (cam 97) of the cam mechanism 99 is formed, is fitted to the second portion 66 (rotatable element), it is not necessary to take into account the orientation of the tapered portion 842, which facilitates the assembly. In addition, the second portion 66 (rotatable element) presses all the plate elements 71 to 74 in the axial direction via the cam mechanism 99 of the first coupling element 81 to activate the steering direction detection sensor 15a or 15b. Therefore, detection by the steering direction detection sensor 15a (15b) is reliably carried out.

The non-rotatable element (end wall 32) and the rotatable element (second portion 66) are arranged on respective sides of the plate elements 71 to 75, which are coaxially supported by the rotary shaft (output shaft 24) of the steering member 2, in the axial direction X1. Therefore, it is possible to arrange the elements of the rotation angle restriction mechanism 14 in a compact space, and it is possible to achieve size reduction. In addition, by accommodating the reaction motor 10 that applies steering reaction force to the steering member 2 and the rotation angle restriction mechanism 14 in the same housing 11, it is possible to achieve simplification of the structure and size reduction in the steer-by-wire vehicle steering system 1.

The invention is not limited to the above-described embodiment. For example, in the above-described embodiment, the cam mechanism 99 moves all the plate elements 71 to 75 in the axial direction. Alternatively, the cam mechanism 99 may move only some of the plate elements (or only one of the plate elements). In short, the cam mechanism 99 just need to axially move the plate element 71 (or 75), which is one of the axially endmost plate elements among the plate elements 71 to 75 and which faces the steering direction detection sensors 15a, 15b, through an operation of the cam mechanism 99.

In the above-described embodiment, the steering direction detection sensors 15a, 15b are contact sensors that are arranged on the bottom portion 871 of the engagement groove 87 of the second coupling element 82 and that detect contact of the top portion 861 of the protrusion 86. Alternatively, the steering direction detection sensors 15a, 15b may be noncontact sensors (infrared ray sensors, or the like) that contactlessly detect approach of the top portion 861 of the protrusion 86. In addition, a steering direction detection sensor may be arranged on the top portion 861 of the protrusion 86 and detect approach or contact of the bottom portion 871 of the engagement groove 87. The urging member 69 just need to apply urging force in a direction opposite to the direction in which the cam mechanism 99 presses the corresponding plate element in the axial direction. In short, the urging member 69 just need to be able to urge the plate elements 71 to 75 in such a direction that the top portion 861 of the protrusion 86 of the second coupling element 82 and the bottom portion 871 of the engagement groove 87 are moved away from each other.

In the above-described embodiment, both the cam 97 and the cam followers 98 that constitute the cam mechanism 99 are formed of inclined surfaces. Alternatively, at least one of the cam 97 and the pair of cam followers 98 may be formed of inclined surfaces. In the above-described embodiment, the protrusion 84 of the first coupling element 81, at which the cam 97 of the cam mechanism 99 is formed, is fixed to the predetermined element (the second portion 66 that serves as the rotatable element). Alternatively, the protrusion 84 of the first coupling element 81 may be formed integrally with the predetermined element from a single member.

In the above-described embodiment, the first coupling element that includes the cam mechanism 99 couples the rotatable element (second portion 66) to the plate element 71 that faces the rotatable element. Alternatively, the first coupling element that includes the cam mechanism 99 may couple the non-rotatable element (end wall 32) to the plate element 75 that faces the non-rotatable element. In this case, the cam mechanism 99 moves all the plate elements 71 to 75 in the axial direction, and the steering direction detection sensors detect axial movement of the plate element 71 that faces the rotatable element (second portion 66). In addition, the first coupling element that includes the cam mechanism 99 may couple the adjacent plate elements 71 to 75. In this case, the cam mechanism 99 moves only some of the plate elements (or one of the plate elements) in the axial direction, and the steering direction detection sensors detect axial movement of the plate element 71 (or 75), which is moved and which is the axially endmost plate element among the plate elements 71 to 75.

In the above-described embodiment, the inner peripheries of the plate elements 71 to 75 are supported by the outer periphery 55a of the tubular member 55 fitted to the outer periphery of the steering shaft 9 (output shaft 24). Alternatively, the inner peripheries of the plate elements 71 to 75 may be directly supported by the steering shaft 9 (output shaft 24) (the structure is not shown). Each friction resistance application element may be a friction layer (not shown) that coats at least one of facing surfaces of adjacent elements.

The urging member 69 and the pressing plate 70 may be interposed between the second portion 66 that serves as the rotatable element and the plate element 71 (the structure is not shown). The plate elements 71 to 75 may be retained by a plain bearing (not shown) retained on the inner periphery of the first portion 65 of the rotor 61.

What is claimed is:

1. A vehicle steering system in which a steering member and a steered wheel are not mechanically coupled to each other, comprising:
    a steering angle sensor that detects a steering angle of the steering member;
    a steered system actuator that drives the steered wheel;
    a rotation angle restriction mechanism that restricts a rotation angle of the steering member within a restricted angular range and that includes:
        a rotatable element that is coaxially rotatable together with a rotary shaft of the steering member;
        a non-rotatable element that faces the rotatable element in an axial direction of the rotary shaft;
        a plurality of plate elements that are interposed between the rotatable element and the non-rotatable element and that are coaxially rotatable with respect to the rotary shaft;
        a plurality of coupling elements, each of which couples adjacent elements among the non-rotatable element, the plurality of plate elements and the rotatable element so as to restrict an amount of relative rotation between the adjacent elements; and
        a cam mechanism that converts rotation of a predetermined one of the plate elements into an axial movement at one of a pair of terminal ends of the restricted angular range to thereby axially move the plate element which is one of the axially endmost plate elements among the plurality of plate elements;
    a steering direction detection unit that detects a steering direction of the steering member and that includes a sensor that is activated when the plate element, which is the one of the axially endmost plate elements, is axially moved at one of the pair of terminal ends of the restricted angular range; and
    a control unit configured to operate in a normal mode in which drive control is executed on the steered system actuator on the basis of the steering angle detected by the steering angle sensor and to operate in a failure mode in which, when there is a malfunction in the steering angle sensor, drive control is executed on the steered system actuator on the basis of the steering direction detected by the steering direction detection unit, wherein
    the steering direction detection unit detects the steering direction on the basis of at which one of the pair of terminal ends of the restricted angular range, the rotation angle restriction mechanism is restricting the rotation angle of the steering member.

2. The vehicle steering system according to claim 1, wherein
    the plurality of coupling elements include: a first coupling element that includes the cam mechanism; and a second coupling element that couples the plate element, which is the one of the axially endmost plate elements, to one of the non-rotatable element and the rotatable element, which faces the plate element, which is the one of the axially endmost plate elements,
    each of the plurality of coupling elements includes: a protrusion that is provided at one of the adjacent elements; and a pair of restricting portions that are respectively arranged at a pair of terminal ends of an engagement groove formed in the other one of the adjacent elements and that selectively contact the corresponding protrusion on the basis of the steering direction of the steering member,
    the sensor that serves as the steering direction detection unit is provided at one of a top portion of the protrusion of the second coupling element and a bottom portion of the engagement groove, and detects approach or contact of the other one of the top portion and the bottom portion, and
    the rotation angle restriction mechanism includes an urging member that urges the plurality of plate elements in such a direction that the other one of the top portion of the protrusion and the bottom portion of the engagement groove is moved away from the steering direction detection unit.

3. The vehicle steering system according to claim 2, wherein the cam mechanism includes an inclined surface formed at at least one of the protrusion of the first coupling element and the restricting portions.

4. The vehicle steering system according to claim 3, wherein the protrusion of the first coupling element includes a tapered portion that is fitted to one of the adjacent elements and that has the inclined surface.

5. The vehicle steering system according to claim 2, wherein the first coupling element is provided at the plate element, which is the other one of the axially endmost plate elements among the plurality of plate elements, and the other one of the non-rotatable element and the rotatable element, which faces the plate element, which is the other one of the axially endmost plate elements.

* * * * *